Oct. 27, 1959   F. M. GUEST   2,909,941
ELLIPTICAL STEERING WHEEL
Filed Nov. 27, 1957
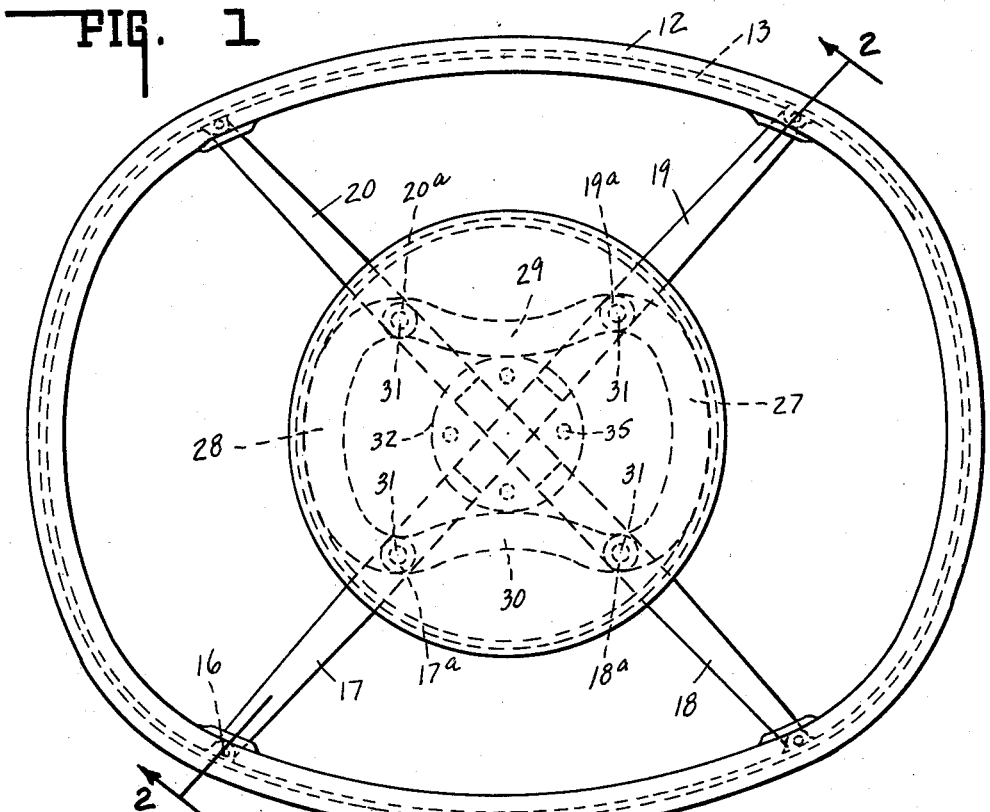
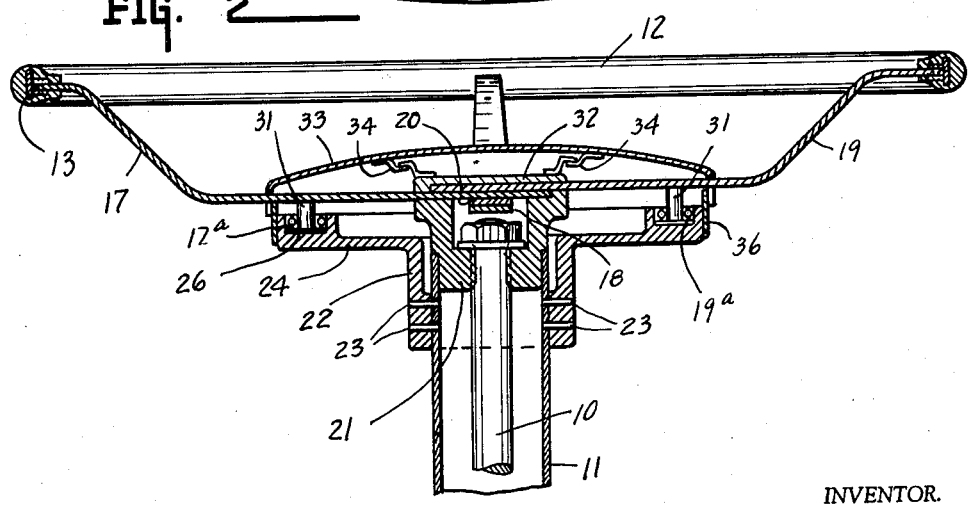
INVENTOR.
FREEMAN M. GUEST.
BY
Lockwood, Galt, Woodard & Smith
ATTORNEYS.

United States Patent Office 2,909,941
Patented Oct. 27, 1959

2,909,941

ELLIPTICAL STEERING WHEEL

Freeman M. Guest, Huntington, Ind.

Application November 27, 1957, Serial No. 699,266

7 Claims. (Cl. 74—552)

The present invention relates generally to steering wheels for vehicles and in particular to a steering wheel having a grip rim which is elliptical in configuration.

With the increase in present day auto traffic and with the increased power and speed of modern autos, providing the driver with a maximum of unrestricted vision has become an important factor in the design of auto interiors. The generally low contour of modern autos has also made it important that maximum accessibility be provided to the auto's seats. With conventional circular steering wheels these two requirements oppose each other and must be comprises in that, if the steering wheel is raised so as to give increased clearance between the steering wheel and the seat, the unobstructed vision area of the driver is decreased and vice versa.

It is the primary object of the present invention to provide a steering wheel assembly in which the grip rim is elliptical in configuration, thereby providing maximum unobstructed driver vision area and increased clearance between the steering wheel and the auto seat.

A further object of the present invention is to provide a steering wheel assembly in which the orientation of the elliptical grip rim is retained as the steering wheel is rotated.

The full nature of the invention will be understood from the accompanying drawings and the following description and claims:

Fig. 1 is a top plan view of a steering wheel assembly embodying the present invention.

Fig. 2 is a sectional view taken generally along the line 2—2 of Fig. 1.

As may be seen in Fig. 2, the steering wheel assembly is mounted upon a conventional steering column 10 housed within a conventional steering column case 11. The steering wheel assembly proper includes a grip rim 12 which is formed of a flexible molded compound such as rubber or a similar synthetic elastomer and has a spring steel core 13. The core is band-like in configuration and is positioned within the rim so that its major plane is generally normal to the plane of the rim, thereby permitting distortion in the plane of the rim but resisting distortion of the rim in other directions.

Pivotally supported at 16 on the rim core are four steering arms 17, 18, 19 and 20. The arms are flanged downwardly, as may be seen in Fig. 2, with their ends received in overlapping relation in a coupling member 21. The member 21 is provided with notches of appropriate depth adjacent its upper margin to slidably receive the terminal portions of the overlapping steering arms. The steering column is rotationally locked by conventional means to the coupling member 21.

A sleeve 22 is rigidly secured to the steering column case by means of pins 23 and has an outwardly flanged portion 24, which, at its periphery, is formed to provide a continuous cam track 26. As may best be seen in Fig. 1, the cam track has a configuration determined by outwardly curved end portions 27 and 28 and inwardly curved side portions 29 and 30. The cam track accommodates cam followers or rollers 17a, 18a, 19a and 20a which are rotatably supported on posts 31 depending from each of the steering arms. A top plate 32, secured by means of screws 35 to the upper end of the coupling member, mounts a concavo-convex cover 33 by means of retainers 34. The marginal portion of the cover is down-turned and slidably overlaps a skirt 36 carried by the peripheral edge of the sleeve 22. Appropriately spaced slots formed in the down-turned margin of the cover accommodate the extending steering arms.

Assuming that the steering wheel assembly is to be used in steering a conventional auto, it will be apparent from Fig. 1 that the horizontal orientation of the major axis of the elliptical grip rim is such as to provide a maximum of clearance between the bottom of the rim and the auto seat, and further provides a maximum of unobstructed driver vision area above the grip rim.

In operation, if the steering wheel is rotated clockwise, as viewed in Fig. 1, it will be evident that the cam followers will proceed clockwise along the cam track. As the cam follower 19a, for example, moves from the side portion 29 of the cam track into the end portion 27 thereof, the effective length of the steering arm 19 will be correspondingly increased. Similarly as the cam follower 20a moves into the side portion 29 of the cam track, the effective length of the steering arm 20 will be correspondingly shortened. The effective lengths of the steering arms 17 and 18 will similarly be lengthened and shortened during the clockwise rotation of the grip rim. It will thus be evident that when the grip rim is moved so as to rotate the steering wheel and consequently the steering column, the orientation of the elliptical grip rim will be retained.

The present invention thus provides a steering wheel assembly in which the grip rim may be given a configuration which provides for maximum accessibility to the driver seat, the orientation of the rim being maintained as the steering wheel is operated to rotate the attached steering column.

The invention claimed is:

1. An elliptical steering wheel assembly for rotating a steering column enclosed by a column case, said assembly including a steering wheel provided with grip rim, said rim having an elliptical configuration and being flexible in the plane thereof, steering arms pivotally joined to said rim and extending inwardly thereof to intersect at the center of said rim, cam followers carried intermediately on each of said arms, means providing a cam track cooperating with said cam followers and fixedly mounted on said column case, said cam track having a curved configuration which retains the orientation of the elliptical rim as the steering wheel is rotated, and motion transmitting means interconnecting said arms and said steering column.

2. An elliptical steering wheel assembly for rotating a steering column including a steering wheel provided with a grip rim, said rim having an elliptical configuration and being flexible in the plane thereof, steering arms pivotally joined to said rim and extending inwardly thereof to intersect at the center of said rim, cam followers carried intermediately on each of said arms, means providing a cam track cooperating with said cam followers, said cam track having a curved configuration which retains the orientation of the elliptical rim as the steering wheel is rotated, and motion transmitting means interconnecting said arms and said steering column.

3. An elliptical steering wheel assembly for rotating a steering column including a steering wheel provided with a grip rim, said rim having a generally elliptical configuration and being flexible in the plane thereof, steering arms pivotally joined to said rim and extending inwardly thereof, cam followers carried by each of said arms, means providing a cam track cooperating with said cam followers, said cam track having a curved configuration which retains the orientation of the elliptical rim as the steering wheel is rotated, and motion transmitting means interconnecting said arms and said steering column.

4. An elliptical steering wheel assembly for rotating a steering column enclosed by a column case, said assembly including a steering wheel provided with a grip rim, said rim having a generally elliptical configuration and being flexible in the plane thereof, steering arms pivotally joined to said rim and extending inwardly thereof, cam means carried by said arms, additional cam means mounted on said column case for cooperation with said first-mentioned means, the coaction of said cam means retaining the orientation of the elliptical rim as the steering wheel is rotated, and motion transmitting means interconnecting said arms and said steering column.

5. An elliptical steering wheel assembly for rotating a steering column including a steering wheel provided with a grip rim, said rim having a generally elliptical configuration and being flexible in the plane thereof, steering arms pivotally joined to said rim and extending inwardly thereof, cam means carried by said arms, additional cam means fixedly mounted to cooperate with said first-mentioned cam means, the coaction of said cam means retaining the orientation of the elliptical rim as the steering wheel is rotated, and motion transmitting means interconnecting said arms and said steering column.

6. An elliptical steering wheel assembly for rotating a steering column including a steering wheel provided with a grip rim, said rim having a generally elliptical configuration and being flexible in the plane thereof, steering arms pivotally joined to said rim and extending inwardly thereof, motion transmitting means interconnecting said arms and said steering column, and a mechanism associated with said steering arms for varying the effective length of the arms as the steering wheel is rotated to thereby retain the orientation of the elliptical rim during such rotation.

7. A steering wheel for motor vehicles having a steering shaft, a support, a hub for attachment to the steering shaft, a flexible resilient rim adapted to rotate through an elliptical path, a plurality of extensible-contractable spokes connecting said rim and said hub together, said spokes radially spaced, a cam on said support corresponding to said elliptical path, and cam followers on said spokes engaging said cam.

References Cited in the file of this patent

UNITED STATES PATENTS

| | | |
|---|---|---|
| 622,880 | Brandenburg | Apr. 11, 1899 |
| 2,507,106 | Knapp | May 5, 1950 |
| 2,799,180 | Madunick | July 16, 1957 |